May 1, 1945. H. E. REICHERT 2,375,039
CONTROL SYSTEM
Filed May 7, 1943
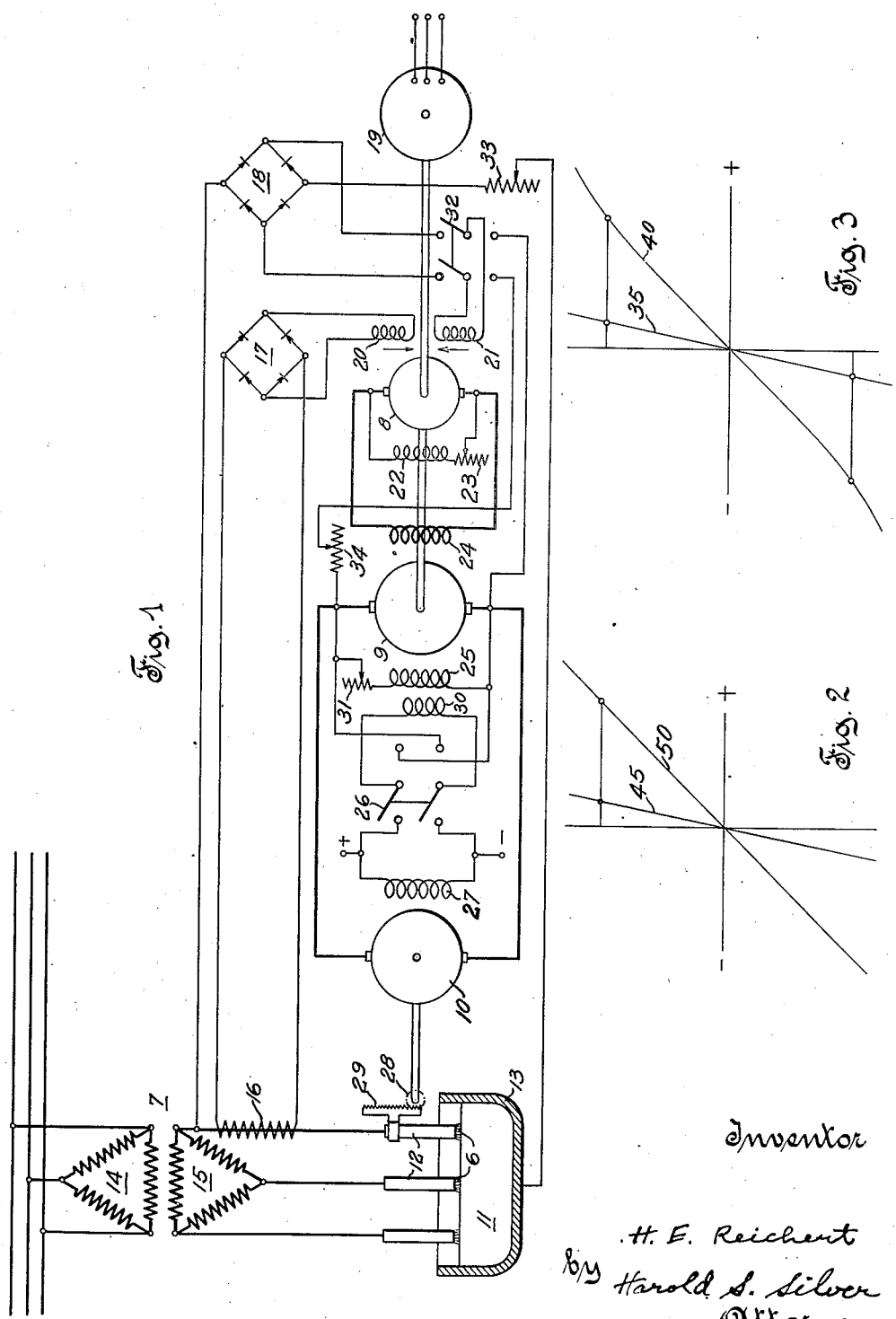
Inventor
H. E. Reichert
by Harold S. Silver
Attorney Patented May 1, 1945

2,375,039

UNITED STATES PATENT OFFICE 2,375,039

CONTROL SYSTEM

Harold E. Reichert, Terminal Island, Calif., assignor to Allis-Chalmers Manufacturing Company, Milwaukee, Wis., a corporation of Delaware Application May 7, 1943, Serial No. 486,048

3 Claims. (Cl. 314—75)

This invention relates in general to control systems utilizing a generator as a regulator and relates particularly to the utilization of such a regulating generator in a system for controlling a motor.

In prior art control systems for controlling the position of a motor operated movable element, such as a movable electrode of an electric furnace, wherein the movement is responsive to a characteristic of operation of such element, weights have been utilized to counterbalance the movable element so that a motor of small size may be used, but in such systems the cost and space requirements of the counterbalancing weights provide disadvantages.

It is an object of the present invention to provide a control system for a motor for controlling such a movable element which avoids disadvantages attendant upon the use of such counterbalancing weights.

It is a further object of the present invention to provide a control system for positioning a motor operated movable element such as an electrode in an electric arc furnace, in which the electrode motor is controlled by a generator the terminal voltage of which is varied responsively to a characteristic of operation of the movable element, and a biasing energization for such generator tending to move the movable element in one direction only.

It is a further object of the present invention to provide an electric arc furnace control system in which the generator controlling the electrode motor will rise from zero to normal voltage more quickly than it will decay from normal voltage to zero.

Objects and advantages other than those above set forth will be apparent from the following description when read in connection with the accompanying drawing, in which:

Fig. 1 is a schematic diagram of connections of one form of a control system embodying the present invention;

Fig. 2 is a curve depicting characteristic features of the regulating generator shown in Fig. 1; and Fig. 3 is a curve depicting characteristic features of the generator supplying the electrode motor shown in Fig. 1.

The invention is illustrated in Fig. 1 in the form in which it may be utilized in a control system for positioning the electrodes in an arc furnace. The electrodes 12 of the furnace 11 are shown supplied with current from a transformer 7 having a secondary 15 connected to the electrodes and a primary 14 connected to any suitable alternating current supply line. The usual reactors and tap changers used with arc furnaces are omitted for simplicity of illustration. Each of the electrodes 12 is movable with respect to the "melt" or charge of material being refined which forms a common electrode for the arcs 6. Only the right hand electrode 12 has been illustrated as movable and the control system for such electrode only is shown. The other electrodes 12 are similarly movable and have a similar control system for each of such electrodes.

The electrode 12 is shown as having a rack 29 thereon cooperating with a gear 28 on the shaft of the electrode motor 10 to raise or lower the electrode as the motor 10 runs in one direction or the other. The motor 10 is energized by a generator 9, the field 24 of which is energized by a regulating exciter 8. The generator 9 and the exciter 8 are driven by any suitable means such as the alternating current motor 19.

Movement of an electrode 12 toward or away from the melt is effected in response to the relative values of the current through the arc 6 at that electrode and the voltage across that arc. When the values of the arc current and the arc voltage are at a predetermined relationship, the electrode is at the proper distance from the melt and the motor 10 is stopped. If the arc current or the arc voltage or both vary from the desired value, the electrode motor 10 is energized in the proper direction to raise or lower the electrode 12 in accordance with the corrective effort required. This corrective effort is applied to the electrode motor 10 through a two stage amplifying system formed by the machines 8 and 9.

Machine 9 has a shunt field 25 and the resistance of this shunt field circuit is controlled by the adjustable resistance 31 so that the characteristics of this field are as shown in Fig. 3. As will be seen from Fig. 3 the field resistance line 35 is to the left of the saturation curve 40 whereby the excitation due to field 25 only is insufficient to maintain terminal voltage on machine 9. The exciting generator 8 has a shunt field 22, the resistance of which is controlled by the adjustable resistance 23 so that the machine characteristics are as shown in Fig. 2. The characteristics of machine 8 are similar to those of the generator 9 in that the field resistance line 45 lies to the left of the saturation curve 50; however, it is preferable for additional accuracy that the magnetic structure of machine 8 be such that it operates only over the straight portion of the saturation curve 50. The terminal voltage of machine 8 will drop to zero if no other excitation is present.

The exciting generator 8 has two control fields 20 and 21. These control fields 20 and 21 are inductively related to each other and are opposed as indicated by the arrows. When the desired values of arc current and arc voltage are present in the furnace 11, the excitation provided by field 20 is equal and opposite to that provided by field 21 and the voltage of machine 8 thereupon drops to zero. The field 20 is connected to a bridge rectifier 17 energized by a current transformer 16 measuring the arc current through electrode 12. The field 21 is connected, when switch 32 is in its upper position, to a bridge rectifier 18 measuring the voltage across the arc 6 by connection to the furnace shell 13 and the lead of electrode 12. The desired relative values of arc current and arc voltage are controlled by the adjustable resistor 33 in the energizing circuit of the field 21. These desired relative values are changed as the charge of cold scrap progresses to a molten body and is refined.

In an arc furnace control system, the regulating problem is unusual because of the high degree of instability of the electrical current and power in the arc. Violent fluctuations in arc current occur as often as every six cycles near the beginning of a melt in a steel furnace, due to the rapidity of changes in ionization, the varying degree of rectification in the arc and the varying arc length. Obviously, it is impractical to move an electrode system, weighing a ton or more, fast enough to correct for such variations by controlling the arc length. However, the variation in average values of arc current and arc voltage may vary from maximum to minimum every one to two seconds, due to the melting away of the metal and the melting of the electrode which changes the arc length. A good regulating system must hold these average values to a minimum variation.

The exciting generator 8 is recognized as a power amplifier, that is, the control power supplied by excess of one of fields 20 or 21 over the other, which is a small percentage of the output delivered by machine 8 to field 24. For a small installation, only one stage of amplification would be necessary, and the generator 8 would supply the electrode motor 10 directly. In the usual size furnaces an added stage of amplification is desirable and this is provided, as in the system shown, by the generator 9.

The improved regulation in an arc furnace control system embodying the present invention is due to several factors. The actuation of the electrode motor 10 is controlled by a measure of arc or heating energy, that is, for any given setting of the adjustable resistance 33 and the taps (not shown) on transformer 7, the control system will hold a predetermined value of voltage across and current in the arc 6. By controlling in response to the differential between a predetermined arc current and a predetermined arc voltage, a faster response, dependent upon the arc energy, is obtained than could be obtained from a response due to current alone.

The corrective effort is proportional to the deviation from normal of the regulated quantity. In other words, the speed of motor 10 in making any regulating change, changes in direct proportion to the change of the differential between current in and voltage across the arc 6. This provides a faster control action when considerable change is necessary, and necessitates only a short period of regulation when a small amount of regulation is required. This control action is especially effective in combination with a regulator responsive to arc current and arc voltage.

A change in an arc current is usually accompanied by an opposite change in arc voltage. As the present regulator is responsive to the differential between arc current and arc voltage, a rapid response to average value changes is obtained. As the windings 20 and 21 are inductively related and opposed, the mutual inductance thereof is effective in preventing response to momentary peak value transients. This is especially effective during the refining period after the metal is completely liquefied and the melt simulates boiling. Transient changes in arc current are caused by bubbles in the melt which soon disappear and therefore require no regulating change for correction.

The present control system is particularly effective in the three phase furnace shown. As the electrodes operate independently of each other, one electrode may bore down through the cold scrap and a cave-in of the metal around the electrode may occur. This causes substantially a short circuit and the current through the arc at that electrode suddenly increases with an accompanying decrease in voltage across that arc. The electrodes of the other two phases may at this instant have a proper arc length and therefore need no regulating action. However, the current through these electrodes will be affected because of the delta connection of the secondary 15 of transformer 7. If the present control should be responsive to current alone, an unnecessary regulating change would be called for on the other phases. In the present control system, due to the fact that the fields 20 and 21 are voltage responsive as well as current responsive, any unnecessary change on the other electrodes due to the cave-in on the third electrode, is avoided or minimized. This advantage is especially effective in that the present corrective effort is proportional to the deviation from normal of the regulated quantity.

In some furnaces the electrodes 12 are counterbalanced by weights, thereby permitting utilization of a small size motor 10 for their operation. When furnaces are not so counterbalanced by weights, the rack 29 and gear 28 may be so designed as to allow the electrodes to drift downward in case of loss of power and failure of the arc, and for such electrode structures, an auxiliary field 30 is provided on generator 9. This field 30 would in such cases be connected by the switch 26, closed to the left as viewed in the drawing, whereby a small constant excitation, just sufficient to effect a counterbalancing of the electrode 10, is provided for generator 9 tending to run the electrode in the upward direction. During a control operation, field 30 causes the voltage of generator 9 to rise more quickly than it will decay, thus causing the electrodes to raise more quickly than they will lower.

On furnaces in which the electrodes 12 are counterbalanced, the electrode motor 10 may continue to run in a direction for which it has been energized, due to residual magnetism in the generator 9. For such furnaces the switch 26 is thrown to the right, as viewed in the drawing, thereby connecting the auxiliary field 30 in a reverse direction across the terminals of the generator 9 in the so-called "suicide" connection. Thus any remnant of magnetism in the machine 9 will be killed by the voltage produced at the terminals by such magnetism. To further provide against drift of the electrode motor in a direction to raise the electrode 10, especially when the control fields 20 and 21 are deenergized, the switch 32 may be moved to the lower position shown in the drawing. This will place any remnant voltage of the machine 9 across the control field 21 thereby providing a voltage at the terminals of machine 8 tending to more quickly kill the remnant voltage of machine 9. When this connection is used, the "suicide" connection of field 30 is unnecessary.

The excitation provided by the shunt fields of machines 8 and 9 may be any predetermined value as long as the lines 35 and 45 are to the left of the saturation curves 40 and 50 as shown in Figs. 2 and 3. In practice it has been found that values of shunt field excitation of from fifteen to twenty-five percent of the ampere turns, required for energization of motor 10, is satisfactory. These self-excited shunt fields 25 and 22 have two functions. First, the required energization supplied by the control fields 20 and 21 to the machine 8 and the energization supplied by the field 24 to the machine 9 will be less and therefore these fields are more sensitive to the needed correction. These self-excited fields 22 and 25 permit the voltages of machines 8 and 9 to rise to normal value more quickly than if such field were not provided and further cause the voltage across these machines to decay less rapidly than if such shunt fields were not provided. The rapid rise of voltage is desirable from the standpoint of obtaining fast response to a needed corrective change. A fast response is especially desirable when the electrode 12 bores down through the scrap in the furnace 11 and such scrap caves in on the electrode. The auxiliary field 30 of generator 9 functions in this regard when connected by switch 26 to the constant source energizing the field 27 of motor 10.

Other uses of the control exciter or regulating generator of the present invention will be apparent to those skilled in this art. Such generator has great utility in any "positioning" control or in any control system where the voltage of the regulating generator is at a constant value for a predetermined constant normal value of the regulated quantity. Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system for an electric arc furnace provided with relatively movable electrodes adapted to have an arc drawn therebetween, motor means for moving one of said electrodes, a generator for supplying current to said motor, means for controlling said generator comprising a dynamoelectric machine provided with two opposed inductively related field windings, means connecting one of said field windings responsively to the current through said arc, means connecting the other of said field windings responsively to the voltage across said arc, and means comprising an auxiliary field winding on said generator energized in a direction to raise said electrode.

2. In a control system, a movable element, electric motor means for moving said element, a generator for selectively supplying current to said motor for running said motor in one direction or the other, means for controlling said generator comprising a dynamoelectric machine provided with field energizing means connected responsively to a characteristic of operation of said element, and auxiliary field energizing means energized in a direction to move said element in one direction only.

3. In a control system, a movable element, electric motor means for moving said element, a generator for selectively supplying current to said motor for running said motor in one direction or the other, means for controlling said generator comprising a dynamoelectric machine provided with two opposed inductively related field windings, means connecting said field windings responsively to characteristics of operation of said element, and auxiliary field energizing means energized in a direction to move said element in one direction only.

HAROLD E. REICHERT.